2,691,551

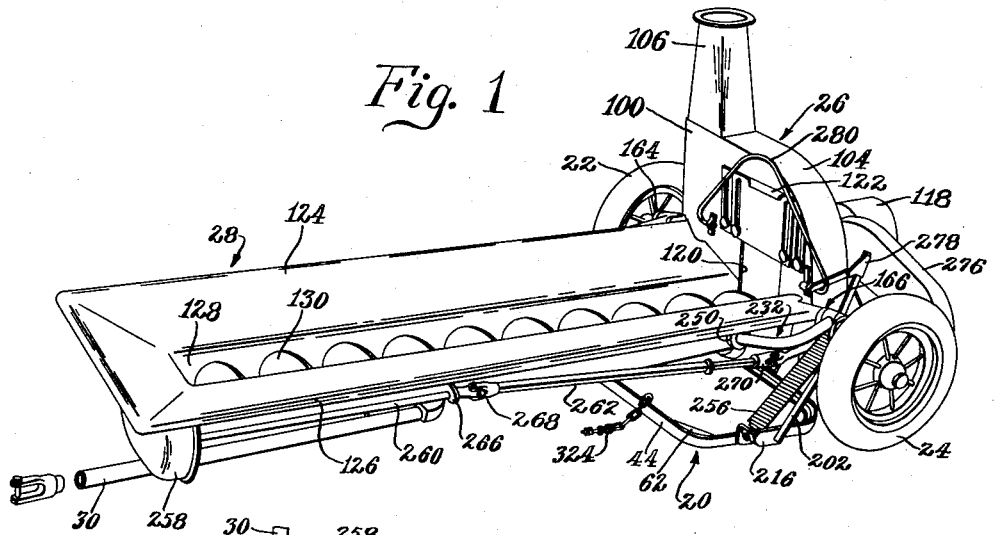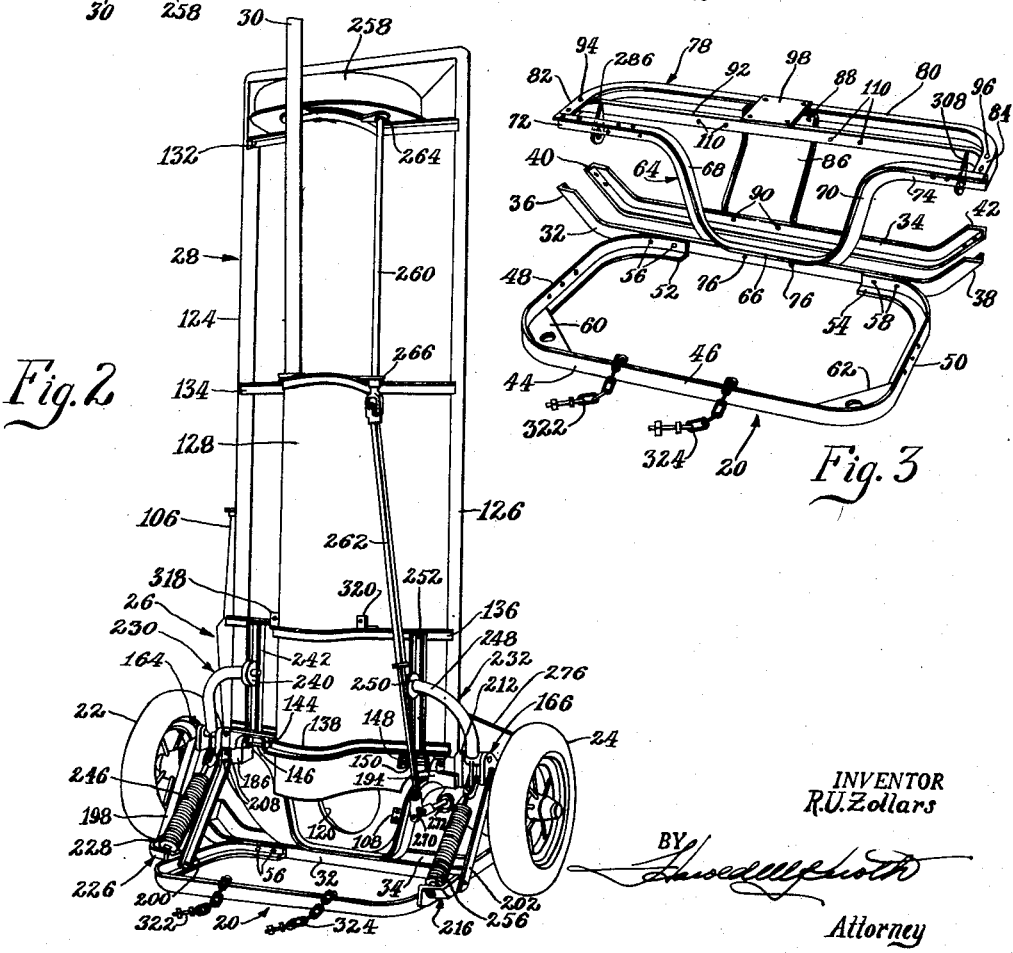

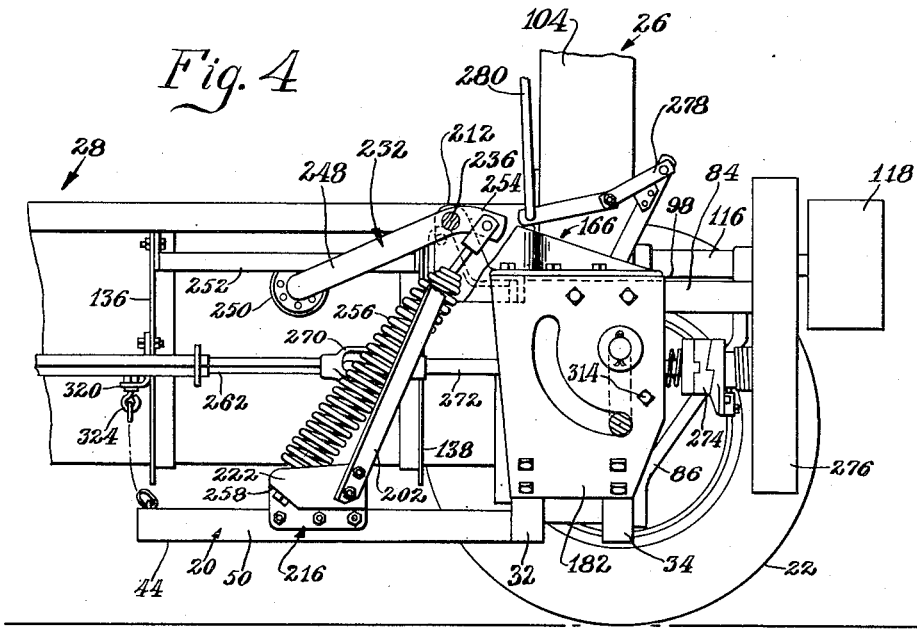
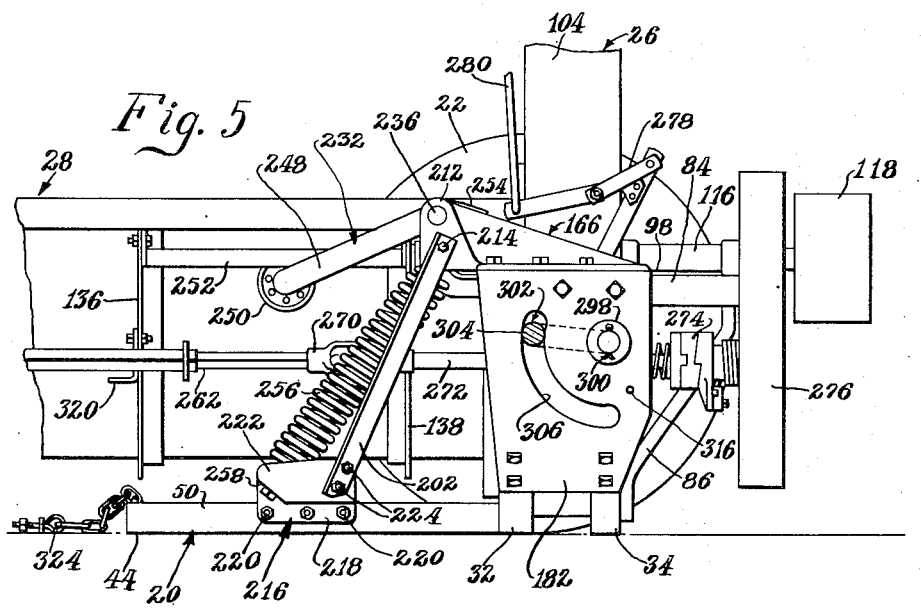

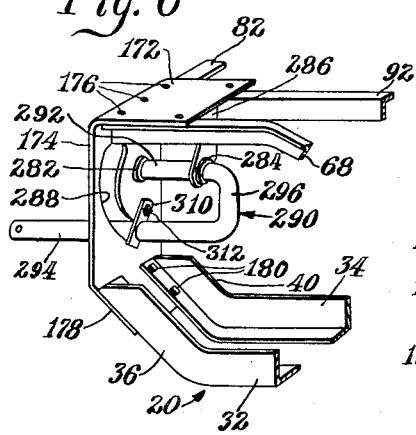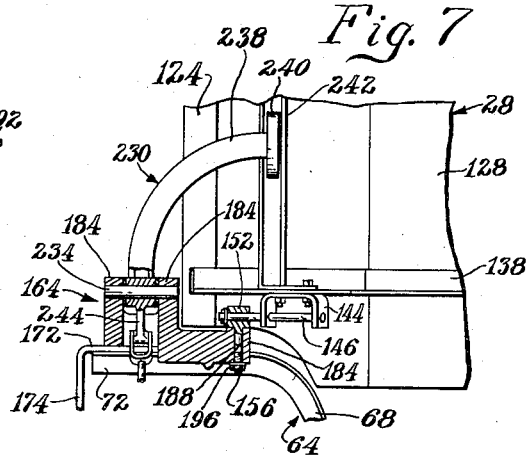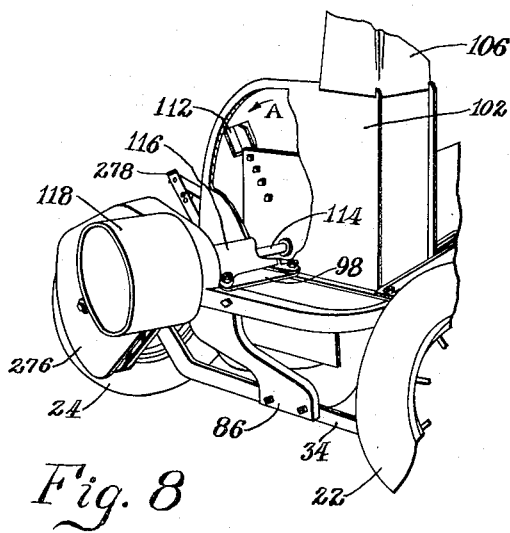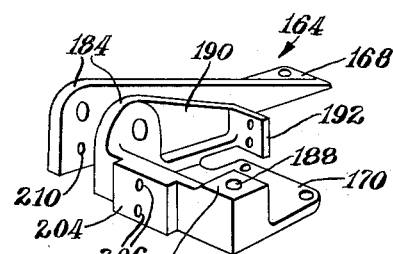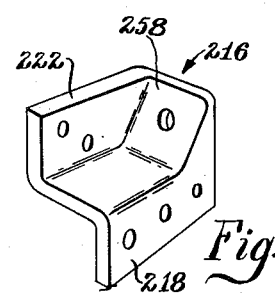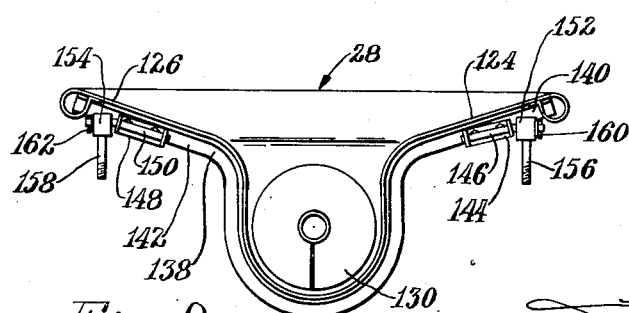
INVENTOR
R. U. Zollars
Attorney Patented Oct. 12, 1954

UNITED STATES PATENT OFFICE 2,691,551

MATERIAL-HANDLING MACHINE

Richard U. Zollars, Ottumwa, Iowa, assignor to Deere Manufacturing Co., Dubuque, Iowa, a corporation of Iowa Application November 20, 1950, Serial No. 196,662

8 Claims. (Cl. 302—37)

This invention relates to material-handling machines and more particularly to such machine as is conventionally known in the agricultural field as a forage or ensilage blower.

A typical conventional machine of this character will normally include a mobile base on which is carried an upright blower housing containing a blower or rotor powered externally as by means of a belt driven from the belt pulley of a stationary engine or tractor. The unit is essentially fixed, and material, such as ensilage, is brought to it from the field and is dumped into a trough or feed table communicating with an inlet opening in one of the walls of the housing. The rotor revolves at a relatively high speed and forces the material upwardly through a discharge stack for delivery into a storage building, such as a silo.

Material brought to the forage blower is carried in wagons. Since it is difficult to back a four-wheeled wagon with a tractor, the feed table on the blower is hinged for upward movement so that it can be tilted upwardly to allow the wagon to be driven forwardly past the position of the feed table. The feed table is then lowered and the wagon is dumped. Because the body of the standard farm wagon or trailer is relatively low, it is desirable that the feed table be low. At the same time it is desirable that the blower have wheels so that it can be moved from one place to another. In some cases, the additional height of the feed table resulting from the use of wheels on the machine is accommodated by removing the wheels or by digging holes in the ground for receiving the wheels so that the operating position of the feed table is substantially lower than its position in transport.

It will be appreciated from the foregoing that a machine of this type must satisfy several requirements, some of them conflicting, in order that a suitable and efficient machine will result. According to the present invention, these requirements are satisfied by the provision of an improved construction including a supporting frame for the blower housing and feed table featuring retractable wheels capable of use in one position for transporting the machine and in another position for effecting lowering of the machine to attain the desired height of the feed table.

It is a principal object of the invention to provide an improved light-weight but sturdy base frame structure for supporting the blower housing and feed table in operating position. The invention has for a further object, improved pivot means for mounting the feed table for tilting relative to the blower housing, the improved means having as a feature thereof releasable connecting parts by means of which the feed table may be readily assembled to or disconnected from the blower housing.

A still further feature of the invention resides in improved means for facilitating the tilting of the feed table or trough, this means including counterbalance or assist springs and lifting levers connected thereto and engageable to exert a lifting force on the feed table. The arrangement is such that the effort required to lift the feed table is substantially constant throughout the range of tilt.

The foregoing and other important objects and desirable features inherent in and encompassed by the invention will become apparent as a preferred embodiment of the invention is fully disclosed in the following detailed description and accompanying sheets of drawings in which:

Figure 1 is a perspective view of the machine from its front and left-hand side, with the feed table in its horizontal position.

Figure 2 is a perspective view showing the feed table tilted to its extreme upward position.

Figure 3 is a perspective view showing the skeleton framework on which the blower housing and feed table are carried.

Figure 4 is a side elevational view, on an enlarged scale, of a rearward part of the left-hand side of the machine, showing the position of the wheel means for transporting the machine.

Figure 5 is a view similar to Figure 4 but showing the position of the wheel means when retracted.

Figure 6 is a fragmentary perspective view showing the mounting of the right-hand axle means on the frame structure.

Figure 7 is a fragmentary sectional view showing the right-hand lifting arm for the feed table.

Figure 8 is a perspective view showing a rear right-hand portion of the machine, a portion of the blower housing being broken away to expose the rotor.

Figure 9 is a rear end view of the feed table or trough.

Figure 10 is a perspective view showing one of the brackets used on the frame for mounting the feed table and the lifting arm therefor.

Figure 11 is a perspective view showing one of the anchor brackets for the counterbalancing springs.

The general construction of the machine will perhaps be best understood from the following brief description in which particular reference is had to Figures 1, 2 and 3. The machine comprises essentially a base frame 20 provided with a pair of wheels 22 and 24 and carrying an upright blower housing 26. The frame also carries a feed table or trough 28 which extends forwardly from the blower housing 26. For the purpose of transport, the wheels 22 and 24 ride on the ground and the machine may be towed by a tractor or other vehicle through the medium of a forwardly extending draft tongue 30.

Reference to the machine as having front and rear ends is made solely for the purpose of clarifying the description. It is immaterial which end is which, but the direction in which the machine is towed conventionally determines its forward end.

The base frame 20 (Figure 3) is made up of a frame structure comprising a pair of parallel transverse lower frame members 32 and 34. The member 32 is turned upwardly at its opposite ends to provide supporting portions 36 and 38. The member 34 is similarly shaped and has supporting portions 40 and 42. A further part of the base frame comprises a lower horizontal U-shaped frame 44 having a transverse bight 46 and opopsite parallel legs 48 and 50. When assembled, the legs extend rearwardly and turn inwardly as at 52 and 54 respectively and are secured by bolts 56 and 58 to the front transverse frame member 32. The corners formed by the junctions of the bight 46 with the legs 48 and 50 are respectively reinforced by apertured diagonal plates 60 and 62. When the machine is set up for operation, stakes may be passed through the apertured plates and driven into the ground to assist in the emplacement of the unit.

A further part of the frame structure comprises a U-shaped member 64 lying in a vertical transverse plane and having a lower bight portion 66 and a pair of upwardly extending legs 68 and 70. These legs extend respectively outwardly at 72 and 74 and terminate respectively directly above the upturned ends 36 and 38 of the transverse frame member 32. The bight 66 of the U-shaped frame 64 is secured to an intermediate portion of the frame member 32 by bolts 76. Here, as elsewhere in the construction, bolts are preferably used, since the disassembly of the structure is facilitated and packaging thereof for shipment is made easier.

The frame structure 20 includes additionally an upper U-shaped frame member 78 lying in a common horizontal plane with the leg portions 72 and 74 of the vertical frame 64. The frame member 78 has a transverse bight 80 and opposite forwardly extending legs 82 and 84. These legs are rigidly joined to the terminal end portions of the legs 72 and 74 on the member 64. An intermediate portion of the bight 80 of the frame 78 is braced to an intermediate portion of the rear lower frame member 34 by means of a downwardly and forwardly inclined brace in the form of a channel 86. The upper and lower ends of this channel are secured respectively to the intermediate frame portions indicated above, as by bolts 88 and 90.

An intermediate transverse upper member 92 is disposed in the common horizontal plane of the frame parts 72, 74 and 78 and extends across and is connected at its opposite ends respectively to the legs 82 and 84 of the U-shaped frame member 78, these connections being preferably effected by bolts 94 and 96. The member 92 lies substantially midway between the frame 64 and the frame 78 and is therefore spaced in a longitudinal direction so as to accommodate or embrace the blower housing 26. The bight 80 of the frame 78 carries intermediate its ends the rear end of a longitudinal support in the form of a plate 98, the front end of which is fixed to an intermediate portion of the transverse intermediate member 92. The purpose of this support will be brought out below.

The blower housing 26 has front and rear transverse, upright walls 100 and 102, spaced apart and secured to a peripheral housing wall 104. The housing thus has a substantially circular shape provided with an upright tangential discharge duct or stack 106, a design that is generally conventional. The housing is received in the base frame 20 between the frames 92 and 64, its bottom resting on the lower frame members 32 and 34 and its front wall being secured to the frame 64 in any appropriate manner, one such connection being indicated at 108 in Figure 2. The rear wall of the housing may be secured in any suitable manner to the transverse frame member 92, which is shown in Figure 3 as having a plurality of bolt openings 110 for that purpose. When the housing is assembled in the frame 20 substantially its upper half is above the level of the frame components 72—74, 78 and 92.

The blower housing encloses a rotor 112 (Figure 8) which may be of conventional construction insofar as the present application is concerned. This rotor is carried on a rotor shaft 114 which extends rearwardly and is journaled in a bearing 116 supported on the horizontal plate or support 98 previously referred to. The rear end of the rotor shaft has keyed thereto a belt pulley 118 about which may be trained a long flat belt for driving the rotor from any suitable source of power, such as the belt pulley of a tractor or power unit. The direction of rotation of the rotor is indicated by the arrow A in Figure 8, resulting in discharge of material upwardly through the stack 106. The brace 86 adds materially to the strength of the base frame structure 20 and provides adequate support for the rotor bearing 116 and its components.

The front wall 100 of the blower housing 26 has a material-inlet or feed opening 120, the size of which may be regulated by feed doors 122. The details of these doors are not important here. As best seen in Figure 2, the opening extends downwardly toward the bottom of the front wall 100 and is bordered by the bight and leg portions 66—68—70 of the frame 64, these portions serving to reinforce the wall about the opening.

The feed table or trough 28 comprises a pair of sides 124 and 126 which flare outwardly from an elongated semi-circular trough 128 in which is rotatably carried a feed auger 130. When the feed table is in the position shown in Figure 1, the auger 130 discharges into the feed opening 120.

The feed table is braced at its underside by a plurality of longitudinally spaced transversely extending U-shaped frame members in the form of angles 132, 134, 136 and 138. The rear angle 138 opposite legs 140 and 142 cooperative with complementary means on the base frame for supporting of the feed table and providing for tilting of the feed table between the positions shown in Figures 1 and 2. Part of the complementary means comprises a bracket 144 secured to the leg 140 of the angle 138 and carrying a pivot pin 146. A similar bracket 148 having a similar pivot pin 150 is carried by the other leg 142. The pivot pins are bent as shown to accomplish a pair of coaxial pivots on a transverse horizontal axis. The pivot pins carry respectively a pair of releasable connecting parts in the form of pivot blocks 152 and 154. These are provided respectively with threaded shanks 156 and 158, the purpose of which will presently appear. Each of the blocks is normally carried by its pivot pin and need not be removed therefrom during disassembly of the feed table from the frame structure 20; although, the pivot blocks can be removed if desired, cotters 160 and 162, respectively, being provided for that purpose.

The other components of the means for releasably and pivotally connecting the feed table 28 to the blower housing and frame structure preferably take the form of a pair of cast brackets 164 and 166 mounted respectively at opposite sides of the blower housing. The bracket 164 is shown by itself in Figure 10 and appears in section in Figure 7. The detailed description of the brackets will be made primarily with reference to the right-hand bracket, with particular emphasis on Figures 7 and 10, it being understood that the left-hand bracket is symmetrically constructed.

The bracket 164 comprises a base having a pair of laterally spaced apart sections 168 and 170. The base portion 170 is secured to the upper surface of the outwardly extending leg 72 of the vertical U-shaped frame 64 and the base portion 168 rests on an upper inturned portion 172 of a supporting member in the form of an upright plate 174 secured at its upper end by a plurality of bolts 176 to the horizontal leg 82 of the frame 78 (Figure 6). This plate lies in an upright longitudinal plane and extends between the frame leg 82 and the upturned ends 36 and 40 of the frame members 32 and 34, the plate 174 having an inwardly bent lower portion 178 rigidly secured by bolts 180 to these end portions. Additional structure and functions of the plate 174 will be subsequently described. A similar plate 182 is provided at the left-hand side of the machine.

The bracket 164 thus forms a rigid part of the base frame 20. This bracket has a pair of apertured ears 184 spaced laterally outwardly from an integral block portion 186 rising from the base section or portion 170. This block portion has a vertical aperture 188. A web 190 extends rearwardly from the inner ear 184 and has at its rear end an apertured mounting flange 192. This flange may be secured to the front wall of the blower housing.

As previously stated, the left-hand bracket 166 is of symmetrical construction and detailed description thereof is deemed to be unnecessary. However, an exception will be made to the extent of designating by the numeral 194 the apertured portion on the bracket 166 that corresponds to the apertured block portion 186 on the bracket 164. The feed table is assembled by inserting the shanks 156 and 158 of the connecting parts 152 and 154 respectively through the apertured block portions 186 and 194. Each of the shank portions receives a nut and lock washer, as suggested at 196 in Figure 7. When it is desired to remove the feed table from the base frame structure it is necessary to make a disconnection only at the cooperative connecting parts 152—186 and 154—194. Since the axes of the apertures through which the shanks 156 and 158 pass are normal to the axis of the pivot pins 146 and 148, assembly and disassembly are relative easily effected without the connection or disconnection of the pivot pin themselves.

The base frame 20 is additionally braced to the vertical frame structure 64—78 by means including a pair of braces 198 and 200 at the right side and by a single brace 202 at the left side of the machine. The lower ends of the braces 198 and 200 are fixed to the base frame 20 and the upper ends thereof are fixed to the casting 164. The front face of the casting has a connecting pad 204 integral therewith and this pad is provided with a pair of tapped bores 206 for receiving cap screws 208 (Figure 2) passed through the upper end of the brace 200. The outer of the apertured ears has a tapped bore 210 for receiving a cap screw (not shown) passed through the upper end of the brace 198.

The left-hand casting or bracket 166 has a pair of apertured ears 212, the outer of which has a tapped bore for receiving a cap screw 214 (Figure 5). The lower end of the brace 202 is secured to the base frame 20 by means of an anchor bracket or casting 216 having a flange 218 by means of which it may be rigidly fixed by bolts 220 to the right-hand longitudinal leg 50 of the horizontal U-shaped base frame 44. This casting is shown by itself in Figure 11, wherein it will be seen that it has an upper side wall 222 to which the lower end of the brace 202 is connected by a pair of bolts 224. A similar and symmetrical bracket or casting 226 is secured to the right-hand leg 48 of the U-shaped frame 44 and the outer right-hand brace 198 is secured at its lower end to an outer wall 228 of the casting 226 (Figure 2).

Tilting of the table 28 about the horizontal axis through the pivots 146 and 148 is assisted and controlled by means including a pair of levers 230 and 232 pivoted respectively on the brackets 164 and 166. The pivot for the right-hand lever 230 comprises a pin 234 passed through the apertured ears 184 (Figure 7); and a similar pin 236 pivotally connects the other lever 232 to the apertured ears 212 of the casting 166.

The lever 230 includes a longer arm 238 which is curved inwardly beneath the feed table 28 and which is equipped with a roller 240 to ride in a longitudinal track 242 preferably formed by a channel running lengthwise between the U-shaped trough braces 136 and 138. This lever also includes a shorter arm 244 to which is connected the upper end of an assist or counterbalancing spring 246. The lower end of this spring is anchored to a forward inclined wall of the right-hand anchor casting or bracket 226. The other lever 232 has a similar longer arm 248 equipped with a roller 250 which runs in a longitudinal track 252 provided beneath the left-hand side of the trough or feed table 28 and extending between the U-shaped braces 136 and 138. This lever likewise has a shorter arm 254 connected to the upper end of a counterbalance or assist spring 256. The lower end of the spring is connected to the left-hand casting or bracket 216. The forward portion of this bracket is provided with an apertured inclined wall 258 for making the connection last referred to. The right-hand bracket is similarly constructed.

The relationship of the shorter lever arms 244 and 254 to the longer arms 238 and 248 and the arrangement of the springs 246 and 256 such that the effort required to tilt the feed table from the position of Figure 1 to the position of Figure 2 is substantially constant throughout the range of tilting. This result follows from the fact that the effective lever or moment arms involved change to compensate for loss of power of the springs 246 and 256 during upward movement of the feed table. In this respect, the arrangement is important, since it is desirable that the feed table be capable of being raised and lowered by one man without too much exertion. This is one of the features that makes the present machine so highly desirable.

The auger is driven from its front end by any suitable means, such as that disclosed in United States Patent No. 2,373,169. The particular drive arrangement is not important here. In the present case, such drive is enclosed in a housing 258 at the forward portion of the feed table 28 and power is supplied to the mechanism within this housing by longitudinal shafting comprising a first shaft section 260 and a second slipshaft section 262 which ultimately derives power from the rotor shaft 114. The first section 260 is journaled at 264 and 266 in bearings carried by the trough braces 132 and 134. This section is connected to the section 262 by a universal joint 268 and the shaft 262 is connected by a universal joint 270 to a short shaft 272 that extends rearwardly at the left-hand side of the machine and that is connected by a suitable clutch 274 to a belt pulley (not shown) enclosed within appropriate shielding 276 forwardly of the belt pulley 118. Any adequate power-transmitting means may be utilized, such as a sheave or pulley on the rotor shaft 114 and a belt interconnecting that sheave and the sheave or pulley that operates through the clutch 274 to drive the shaft 272. The clutch 274 may be controlled through the medium of appropriate linkage 278 associated with a safety bail 280 pivotally supported and extending across the housing front wall 100 and bordering the upper portion of the feed opening 120. The purpose of this bail is to provide a convenient control by means of which the operator may immediately disengage the clutch 274, which is important from the safety standpoint, inasmuch as it will be actuated automatically by engagement with any object substantially larger than the feed opening 120.

The following will pertain to the mounting of the wheels 22 and 24 of the machine. As previously described, the base frame 20 is provided at its opposite sides with the upright supporting means or plates 174 and 182. These plates carry means for mounting the wheels. As best shown in Figure 6, the right-hand plate 174 is provided adjacent an upper portion thereof with a bearing 282 in line with a bearing 284 carried by a bracket 286 fixed to the right-hand end of the transverse intermediate frame member 92 (Figure 3). The plate 174 is provided with an arcuate slot 288 having the axis of the bearing 282 as its center. This slot serves as guide means for a cranked axle 290 having upper and lower journal portions 292 and 294 respectively, these portions being rigidly connected by a short vertical arm 296. The upper journal portion 292 is rockably carried in the bearings 282 and 284 and the longer lower journal portion 294 extends outwardly through the arcuate slot 288 to carry the right-hand wheel 22. The left-hand plate 182 is provided with corresponding bearing structure including a bearing 298 in which is pivoted an upper journal portion 300 of a left-hand cranked axle 302. This axle has a longer lower journal portion or stub axle part 304 that extends outwardly through an arcuate slot 306 formed in the plate 182 with the bearing 298 as its center. This stub axle part carries the left-hand axle wheel 24.

The cranked axles 290 and 302 may be swung about their bearings 282—284 and 298—308 (Figure 3) between lower and upper positions, as indicated respectively in Figures 4 and 5. When the axles are in their lower positions, the wheels 22 and 24 rest on the ground and sustain the total weight of the proximate end of the machine, with the base frame structure 20 clear of the ground. With the wheels in this position, the machine is mobile and may be transported. The axles are releasably lockable in their lower positions by means such as that indicated in Figure 6, wherein it will be seen that the right-hand axle 290 is provided with an apertured lug 310, which receives a removable bolt 312 passed through an aperture (not shown) in the plate 174. A similar arrangement is provided for the left-hand axle and plate, the removable bolt being visible at 314 in Figure 4 and the aperture for receiving this bolt being visible at 316 in Figure 5. In order to emplace the machine for operation, it is necessary merely to remove the bolts 312 and 314, and the wheels will then retract from the position of Figure 4 to that of Figure 5. The machine may be raised on the wheels in any convenient manner, such as by utilizing a pair of braces disposed diagonally between the brackets 164 and 166, these braces inclining in a forward direction so that when the machine is moved forwardly it will rise on the braces and the wheels will drop to the position of Figure 4, in which position they may again be secured by the bolts 312 and 314.

The U-shaped brace 136 for the feed table 28 is provided at opposite sides of the trough 128 with apertured ears 318 and 320 which may be releasably connected to chains 322 and 324 for tying the feed table and base frame 44 together during transport. The chains may be disconnected as shown in Figures 2 and 5 so that the feed table can be tilted upwardly during operation.

The various features and advantages of the design and construction disclosed are thought to be clear from the foregoing description. Various other features and advantages not specifically enumerated will undoubtedly occur to those versed in the art, as likewise will many variations and modifications of the preferred embodiment of the invention illustrated, all of which may be achieved without departing from the spirit and scope of the invention.

I claim:

1. A forage blower, comprising: an upright blower housing having front and rear upright walls and opposite sides; a pair of lower, horizontal frame members secured to the bottom of the housing, running respectively along said front and rear walls and having opposite end portions projecting at opposite sides of the housing and turned upwardly; a pair of upper, horizontal frame members disposed respectively above the lower frame members and secured respectively to the front and rear walls of the housing and having opposite end portions projecting at opposite sides of the housing respectively in substantial vertical alinement with the upturned end portions of the lower frame members; a pair of upright side plates, one at each side of the housing and secured to the end portions of the upper and lower frame members at that side; each plate having a bearing therein and a generally upright arcuate slot having said bearing as a center, said bearings being alined on a horizontal axis parallel to the housing faces; a pair of crank axles, each having upper and lower horizontal journals connected by a vertical intermediate part, said upper journals being carried respectively by the plate bearings and the lower journals extending outwardly respectively through the arcuate slots, with the intermediate parts respectively alongside the plates, whereby each crank axle may pivot about its bearing and its lower journal will travel in its slot; means for releasably securing each crank axle selectively at the lower end of its slot to position the lower journal in a lower position, or for positioning at the upper end of its slot when said means is released; and a pair of wheels, one journaled on the lower journal of each crank axle, said wheels being constructed and proportioned in relation to the plate slots and bearings as to sustain the housing and lower frame members clear of the ground when the crank axles are in their lower positions, or to be clear of total weight support when the crank axles are in their upper positions so that the lower frame members rest on the ground to sustain the housing.

2. A forage blower, comprising: an upright blower housing having front and rear upright walls and opposite sides; lower, horizontal frame means secured to a bottom portion of the housing and having opposite end portions projecting at opposite sides of the housing; upper, horizontal frame means disposed above the lower frame means and secured to an upper portion of the housing and having opposite end portions projecting at opposite sides of the housing respectively in substantial vertical alinement with the end portions of the lower frame means; a pair of upright side members, one at each side of the housing and secured to the end portions of the upper and lower frame means at that side; each member having a bearing carried thereby and means providing a generally upright arcuate guide having said bearing as a center, said bearings being alined on a horizontal axis; a pair of crank axles, each having upper and lower horizontal journals connected by a vertical intermediate part, said upper journals being carried respectively by the bearings and the lower journals being guided respectively by the arcuate guides, with the intermediate parts respectively alongside the members, whereby each crank axle may pivot about its bearing and its lower journal will travel in its guide; eans for releasably securing each crank axle selectively at the lower end of its guide to position the lower journal in a lower position, or for positioning at the upper end of its guide when said means is released; and a pair of wheels, one journaled on the lower journal of each crank axle, said wheels being constructed and proportioned in relation to the guides and bearings as to sustain the housing and lower frame means clear of the ground when the crank axles are in their lower positions, or to be clear of total weight support when the crank axles are in their upper positions so that the lower frame means rests on the ground to sustain the housing.

3. A forage blower, comprising: an upright blower housing having front and rear upright walls and opposite sides; lower, horizontal frame means secured to a bottom portion of the housing and having opposite end portions projecting at opposite sides of the housing; upper, horizontal frame means disposed above the lower frame means and secured to an upper portion of the housing and having opposite end portions projecting at opposite sides of the housing respectively in substantial vertical alinement with the end portions of the lower frame means; a pair of upright side members, one at each side of the housing and secured to the end portions of the upper and lower frame means at that side; each member having a bearing carried thereby; a pair of crank axles, each having upper and lower horizontal journals connected by a vertical intermediate part, said upper journals being carried respectively by the bearings and the lower journals being respectively pivotable about said bearings selectively between upper and lower positions; means for releasably securing each crank axle selectively in its lower position or its upper position; and a pair of wheels, one journaled on the lower journal of each crank axle, said wheels being constructed and proportioned in relation to the crank axles and bearings as to sustain the housing and lower frame means clear of the ground when the crank axles are in their lower positions, or to be clear of total weight support when the crank axles are in their upper positions so that the lower frame means rests on the ground to sustain the housing.

4. A forage blower, comprising: an upright blower housing having front and rear walls and opposite sides, one of said walls having a material-inlet opening therein; a feed trough extending normally to said last named wall for feeding material into the housing via said opening; supporting means carrying the blower housing and including a bottom portion constructed to rest on the ground at times to sustain the blower housing, and further including at each of the opposite sides of the blower housing an upright plate having a bearing on a horizontal axis and an arcuate upright slot having said bearing as a center, said bearing being alined on a horizontal axis above the bottom portion of said supporting means; wheel means for selectively sustaining the blower housing and supporting means clear of the ground or supported on the ground via the bottom portion of the supporting means, said wheel means including a pair of arms pivoted respectively on said bearings, each arm having an axle extending horizontally through and guided by a respective arcuate slot for movement between upper and lower positions, and a pair of wheels respectively on the axles for carrying the weight of the blower, supporting means and feed trough clear of the ground when the axles are in their lower positions or for retraction of said wheels clear of total weight support so that the bottom portion of the supporting means rests on the ground; and means for releasably securing the arms and axles in their lower positions.

5. A forage blower, comprising: an upright blower housing having front and rear walls and opposite sides, one of said walls having a material-inlet opening therein; a feed trough extending normally to said last named wall for feeding material into the housing via said opening; supporting means carrying the blower housing and including a bottom portion constructed to rest on the ground at times to sustain the blower housing, and further including at each of the opposite sides of the blower housing a bearing on a horizontal axis, said bearings being alined on a horizontal axis above the bottom portion of said supporting means; wheel means for selectively sustaining the blower housing and supporting means clear of the ground or supported on the ground via the bottom portion of the supporting means, said wheel means including a pair of arms pivoted respectively on said bearings, each arm having a horizontal axle portion, for movement of the axle portions between upper and lower positions, and a pair of wheels respectively on the axle portions for carrying the weight of the blower, supporting means and feed trough clear of the ground when the axle portions are in their lower positions or for retraction of said wheels clear of total weight support so that the bottom portion of the supporting means rests on the ground; and means for releasably securing the arms in their lower positions.

6. A forage blower, comprising: an upright blower housing having front and rear walls and opposite sides, one of said walls having a material-inlet opening therein; a feed trough extending normally to said last named wall for feeding material into the housing via said opening; supporting means carrying the blower housing and including a bottom portion constructed to rest on the ground at times to sustain the blower housing, and further including bracket means at each side of the housing; a pair of wheels associated respectively with the bracket means; a pair of mounting means, one mounting each wheel on a bracket means and both wheel-mounting means being carried by the respective bracket means for vertical movement relative to the bracket means to provide for selective shifting of the wheels between a lower position, in which the wheels engage the ground and support the weight of the housing, supporting means and feed trough, and an upper position in which the wheels are relieved of total weight support so that the supporting means rests on the ground and sustains the housing and feed trough; and means for releasably securing each wheel-mounting means in its lower position.

7. The invention defined in claim 6, in which: each bracket means includes an upright plate having a horizontally inwardly extending portion; a first bearing is provided in each plate and a coaxial second bearing is carried by the plate upper portion; each plate has an arcuate slot with the bearing axis as a center; and each wheel-mounting means is a cranked axle having upper and lower horizontal shaft portions and a connecting portion therebetween, said upper shaft portion of each axle being journaled in the respective coaxial first and second bearings and the lower shaft portion projects outwardly through the arcuate slot to carry its wheel.

8. A crop blower comprising a frame, a feed trough, blower means on said frame for receiving the crop from said trough and elevating and discharging the same under pressure, ground wheels for said frame, trunnions on said frame for mounting said wheels, and means for adjusting the elevation of said trunnions to either lower said wheels into transporting engagement with the ground or to raise said wheels and lower said frame into engagement with the ground for preventing movement of said frame and trough during the operation of said blower.

References Cited in the file of this patent

UNITED STATES PATENTS

| Number | Name | Date |
| --- | --- | --- |
| 2,373,169 | Coultas et al. | Apr. 10, 1945 |
| 2,486,577 | Stoddard | Nov. 1, 1949 |
| 2,616,765 | Hill | Nov. 5, 1952 |